US012615238B2

(12) United States Patent
Zhang et al.

(10) Patent No.: US 12,615,238 B2
(45) Date of Patent: Apr. 28, 2026

(54) PROBE-BASED VIRTUAL NETWORK SENSITIVE DATA TRAFFIC DETECTION

(71) Applicant: Proofpoint, Inc, Sunnyvale, CA (US)

(72) Inventors: Yang Zhang, Fremont, CA (US); Ravishankar Ganesh Ithal, Los Altos, CA (US); Ajay Agrawal, Bangalore (IN)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 18/781,088

(22) Filed: Jul. 23, 2024

(65) Prior Publication Data
US 2025/0039146 A1     Jan. 30, 2025

(51) Int. Cl.
*H04L 9/40* (2022.01)

(52) U.S. Cl.
CPC ...... *H04L 63/0272* (2013.01); *H04L 63/0245* (2013.01)

(58) Field of Classification Search
CPC ........................ H04L 63/0272; H04L 63/0245
See application file for complete search history.

(56) References Cited

U.S. PATENT DOCUMENTS

| | | | |
|---|---|---|---|
| 11,743,142 B1 * | 8/2023 | Sanghvi | H04L 41/5041 |
| | | | 709/223 |
| 2019/0028345 A1 * | 1/2019 | Kommula | H04L 41/0816 |
| 2021/0075596 A1 * | 3/2021 | Rohel | H04L 63/062 |
| 2023/0101915 A1 * | 3/2023 | Bailey | G06F 11/3006 |
| | | | 709/219 |
| 2024/0078123 A1 * | 3/2024 | Sridhar | H04L 67/34 |
| 2024/0340234 A1 * | 10/2024 | An | H04L 45/566 |

* cited by examiner

*Primary Examiner* — William J. Goodchild

(74) *Attorney, Agent, or Firm* — FP Patents; Sikander M. Khan; Chris Volkamann

(57) ABSTRACT
The technology disclosed relates to detection of data traffic in computing environments, such as cloud environments. Example systems and methods detect a plurality of workloads in a virtual network in a computing environment and deploy a plurality of probe agents to the plurality of workloads. Each respective probe agent detects network traffic on a respective workload of the plurality of workloads, scans a data packet that is at least one of sent or received by the respective workload, generates a data classification relative to the data packet, and generates a scan result that includes packet payload information and an indication of the data classification. The scan results are received from the plurality of probe agents and a computing action is performed based on scan results.

20 Claims, 16 Drawing Sheets

PROBE-BASED VIRTUAL NETWORK SENSITIVE DATA TRAFFIC DETECTION

CROSS-REFERENCE TO RELATED APPLICATION

The present application claims the benefit of Indian application No. 202311051176, filed Jul. 29, 2023, the contents of which is hereby incorporated by reference in its entirety.

FIELD OF THE TECHNOLOGY DISCLOSED

The technology disclosed generally relates to detection of data traffic in computing environments, such as cloud environments. More specifically, but not by limitation, the present disclosure relates to improved systems and methods of cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

There are many types of computing environments that provide data compute and/or storage resources for organizations or other end users. Cloud computing, for example, provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

In some instances, a virtual network enables creation of a logically isolated section of the cloud environment, where workloads such as compute resources, storage resources, load balancers, etc. can be implemented. Thus, the virtual network in the cloud can provide a software-defined network that allows multiple workloads to communicate with each other, just as if they were on the same physical network. The virtual network can be created by configuring a set of network resources such as virtual machines, subnets, IP addresses, and security groups. These resources are logically grouped together to form a virtual network that operates in isolation from other virtual networks in the cloud.

The discussion above is merely provided for general background information and is not intended to be used as an aid in determining the scope of the claimed subject matter.

SUMMARY

The technology disclosed relates to detection of data traffic in computing environments, such as cloud environments. Example systems and methods detect a plurality of workloads in a virtual network in a computing environment and deploy a plurality of probe agents to the plurality of workloads. Each respective probe agent, of the plurality of probe agents, detects network traffic on a respective workload, of the plurality of workloads, scans a data packet that is at least one of sent or received by the respective workload, generates a data classification relative to the data packet, and generates a scan result that includes packet payload information and an indication of the data classification. The scan results are received from the plurality of probe agents and a computing action is performed based on scan results.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
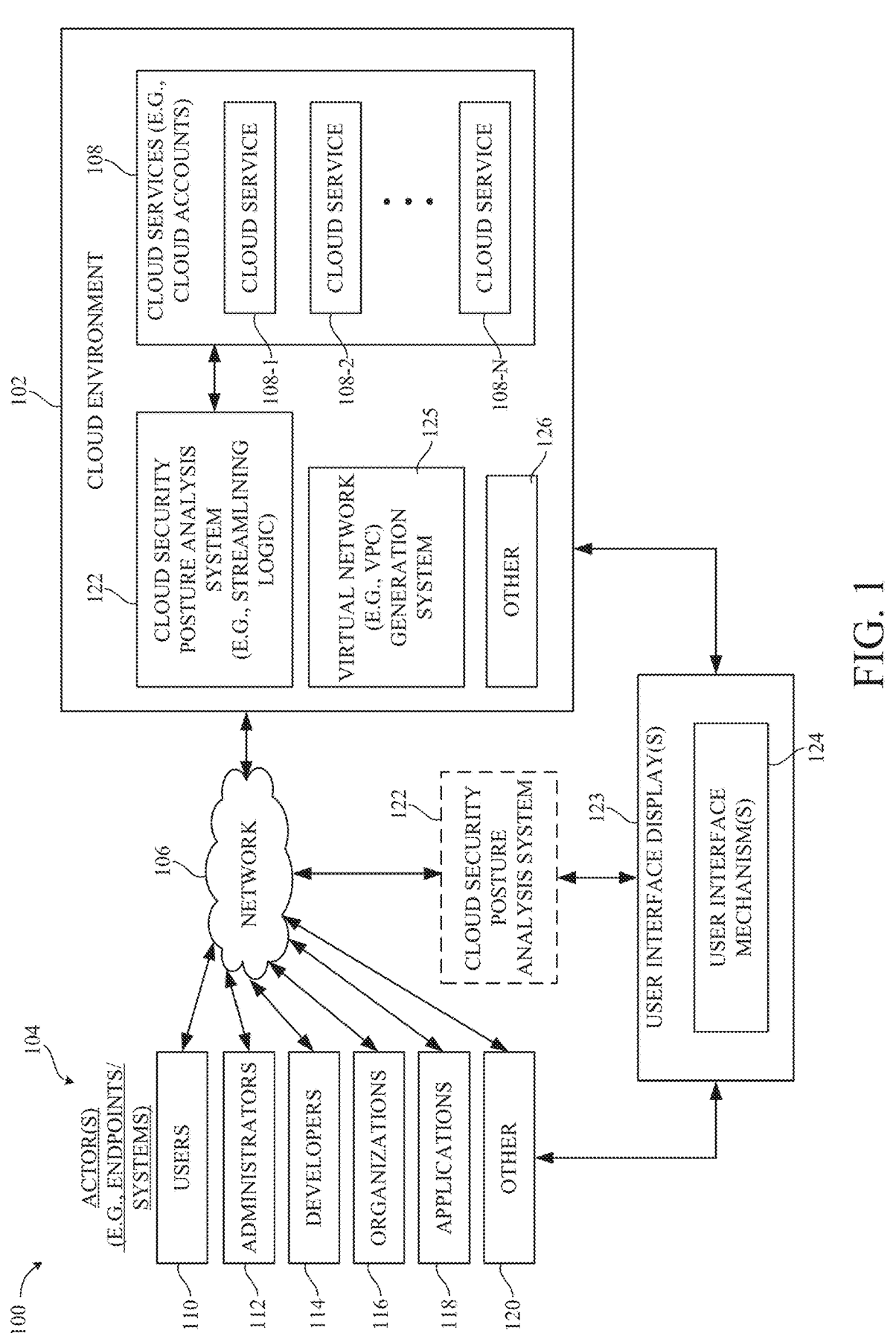
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, virtual networks can be configured in a cloud environment, or other computing environment, that allows workloads or nodes to communicate with each other. A virtual network can be created by configuring a set of network resources such as virtual machines, subnets, IP addresses, and security groups. These resources are logically grouped together to form a virtual network that operates in isolation from other virtual networks in the cloud. Virtual networks provide several benefits for cloud computing, including improved security, scalability, and flexibility. By using a virtual network, organizations or other end users can control the network traffic between their cloud resources and define rules to restrict access to specific resources. The users can also easily scale their network as needed and move their resources across different data centers or regions without disrupting network configurations.

One example of a virtual network is referred to as a virtual private cloud (VPC) that allows control of network configuration, including IP address range, subnets, routing tables, and network gateways. Further, security groups and network access control lists (ACLs) can be created and configured to control traffic flow in and out of the VPC. There are many different examples of virtual private clouds provided by various cloud providers. Some examples include, but are not limited to, Amazon Web Services™ (AWS) VPC, Microsoft Azure™ Virtual Network (VNet), IBM Cloud™ VPC, and Google Cloud Platform™ (GCP) VPC, to name a few. It is noted that while examples are discussed herein in the context of AWS, other types of cloud services and providers are within the scope of the present disclosure. Further, while examples are discussed herein in the context of VPCs, other types of virtual networks are within the scope of the present disclosure. Thus, features discussed in the context of a VPC are not to be construed as limited to virtual private clouds or a particular cloud provider.

In many network architectures, workloads (such as virtual machines, data centers, databases, hosts, etc.) communicate with endpoints, such as outside Internet or external applications. To inspect such network traffic, a network firewall can be configured to collect the traffic, inspect the packets, and detect sensitive data moving across the network. However, in cloud native environments, data traffic often moves within and/or between workloads in a given virtual network (e.g., a virtual private cloud (VPC)). This is especially the case with API-driven microservices and the rise of Kubernetes-based platform engineering, networking, and security. Network firewall approaches are not well suited to detect, if at all, data traffic within such virtual networks.

The present disclosure is directed to a probe-based virtual network traffic activity detection system that is configured to detect network traffic where data packets are sent and/or received by workloads (e.g., physical machines, databases, virtual machines, data centers, etc.). The traffic can include inter-network traffic (in which a workload receives a data packet from a workload outside the network, such as from another virtual network) and/or intra-network traffic in which data packets are sent between workloads within a same virtual private network. Examples of traffic include, but are not limited to, copying of data from a workload, querying data in a workload, etc.

Before discussing the system in further detail, a discussion of example cloud architectures in which the system can be deployed, will be discussed.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud security posture data. Examples of system 122 are discussed in further detail below. Briefly, however, system 122 is configured to access cloud services 108 and identify connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Architecture 100 includes a virtual network generation system 125 configured to generate virtual networks, such as virtual private clouds (VPCs), in cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 126 as well.

Figure 2:
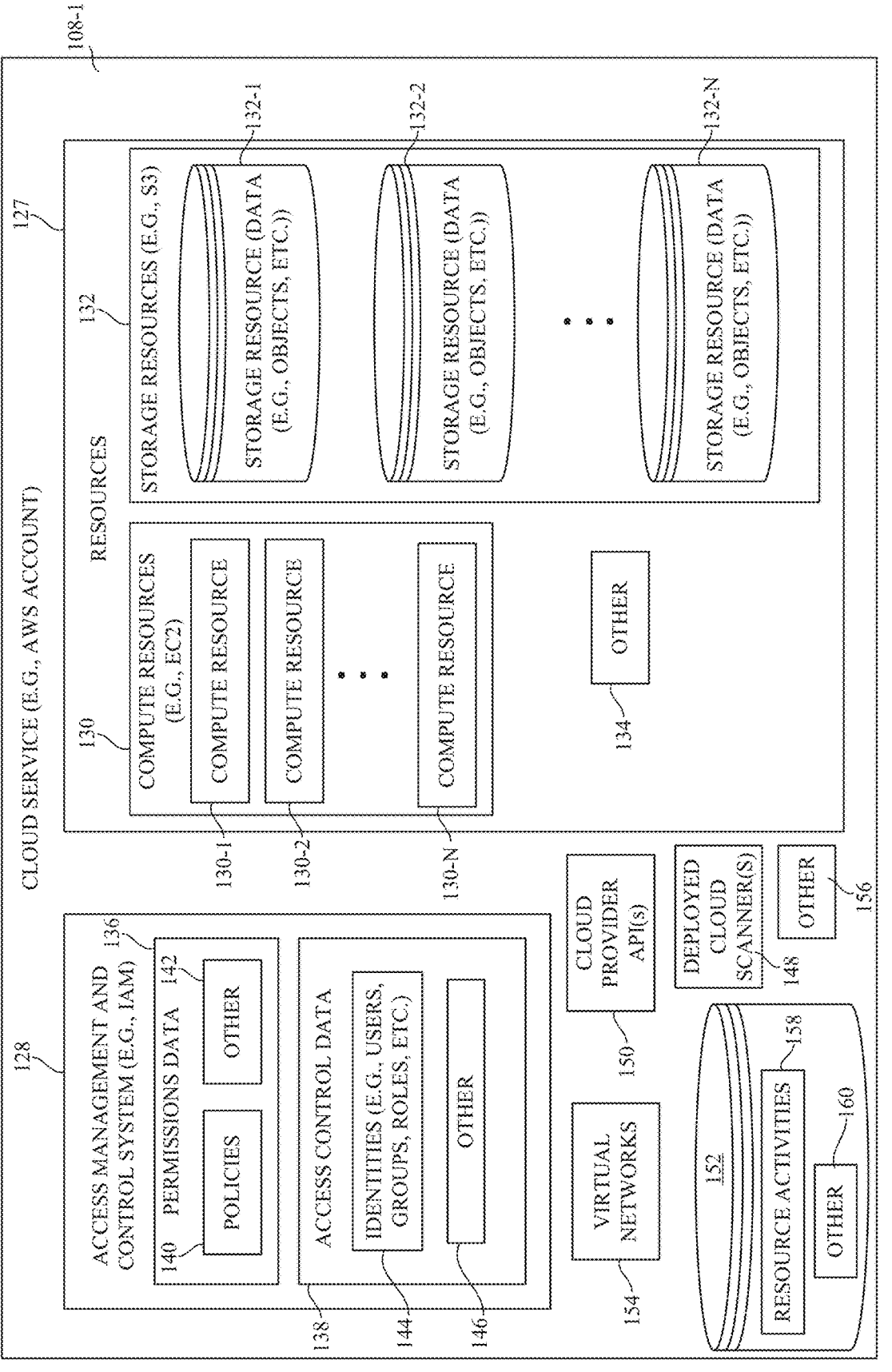
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 127 and an access management and control system 128 configured to manage and control access to resources 127 by actors 104. Resources 127 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources that can be dynamically provisioned and de-provisioned as per the needs of the user or application. These resources include processing power, memory, storage, and network bandwidth that can be scaled up or down quickly to accommodate changes in demand. Elastic compute resources are often used in cloud computing environments, where virtual machines or containers can quickly and easily be provisioned with the required computing resources.

In the context of AWS, examples of elastic compute resources include EC2 (Elastic Compute Cloud) resources, Lambda resources (serverless computing service function), and ECS (Elastic Container Service).

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

An example virtual machine (VM) is a software emulation of a physical computer system, and is created by software referred to as a hypervisor, which enables multiple operating systems to run on a single physical machine simultaneously. Each virtual machine runs its own isolated environment, complete with its own virtual CPU, memory, storage, and network interface.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a serverless, event-driven compute service that allows a user to run code for many different types of applications or backend services without provisioning or managing servers.

An example serverless function is a block of code that runs in a cloud environment without the need for a dedicated server to host it. In an example serverless computing architecture, a cloud provider manages the infrastructure and automatically allocates resources to run the function when the function is triggered. The serverless functions are event-driven, meaning they are only executed in response to a specific event, such as an HTTP request or a message from a queue. When an event is triggered, the serverless function is automatically instantiated, executed, and then shut down, without the need for the user to manage any underlying infrastructure.

Other examples of elastic compute resources include, but are not limited to, Google Compute Engine, Google Kubernetes Engine, Microsoft Kubernetes Engine, Azure Virtual Machine, to name a few.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc.

Policies 140 can include identity-based policies that are attached to identities can grant permissions to the identity. Policies 140 can also include resource-based policies that are attached to resources 127. Examples include S3 bucket policies and role trust policies.

Cloud service 108-1 includes one or more deployed cloud scanners 148, cloud provider application programming interface(s) (APIs) 150, a data store 152, virtual networks 154 created by system 125, and can include other items 156 as well. Cloud scanner 148 run locally on the cloud-based services and the server systems, and can utilize elastic compute resources that can be dynamically provisioned and de-provisioned. Data store 152 stores resource activity information 158 representing resource activities managed in virtual networks 154. Data store 152 can store other items 160 as well.

Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

As noted above, in some examples, resources 127 can include AWS EC2 and/or Lambda resources. Also, resources 127 can include AWS Instance Stores and/or AWS Elastic Block Store (EBS) volumes. An EBS volume is a durable, block-level storage device that can attach to a compute instance and used as a physical hard drive.

Resources 127 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

For sake of illustration, but not by limitation, a service role can be assumed by an AWS service to perform actions on behalf of users. For instance, as a service that performs backup operations for a client, Amazon Data Lifecycle Manager requires that the client pass in a role to assume when performing policy operations on the client's behalf. That role must have an IAM policy with the permissions that enable Amazon Data Lifecycle Manager to perform actions associated with policy operations, such as creating snapshots and Amazon Machine Images (AMIs), copying snapshots and AMIs, deleting snapshots, and deregistering AMIs. Different permissions are required for each of the Amazon Data Lifecycle Manager policy types. The role must also have Amazon Data Lifecycle Manager listed as a trusted entity, which enables Amazon Data Lifecycle Manager to assume the role.

Figure 3:
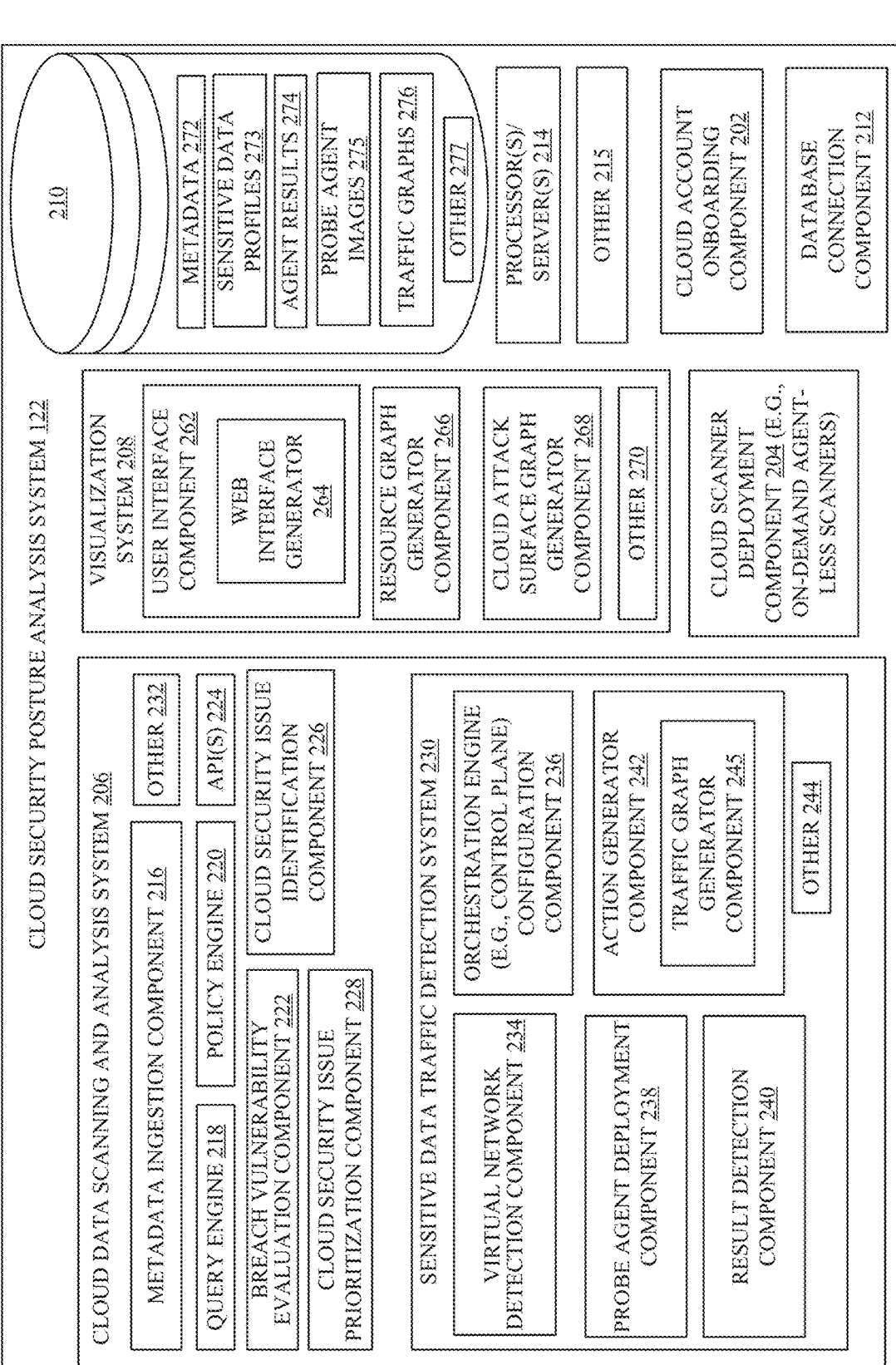
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on resources 127 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, a sensitive data traffic detection system 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Sensitive data traffic detection system 230 includes a virtual network detection component 234, an orchestration engine configuration component 236, a probe agent deployment component 238, a result detection component 240, an action generator component 242, and can include other items 244 as well.

Virtual network detection component 234 is configured to detect virtual networks (e.g., virtual private clouds) in cloud environment 102. In one example, the virtual network detection is performed through an orchestration engine configured by component 236.

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that deployable and scalable independently of other services.

One example orchestration engine provides a control plane having a set of services and processes that manage the virtual network infrastructure, including the configuration, security, and routing. The control plane provisions and manages components in the VPC, such as subnets, route tables, security groups, and internet gateways. The control plane provides centralized management for the VPC, and provides the ability to define and enforce policies that govern network access, security, and routing.

In AWS, a VPC control plane is provided by the AWS management console, the AWS command-line interface (CLI), and the AWS APIs. The AWS Management Console is a web-based user interface that interaction with AWS services, including ECS, through a graphical interface. With the console, users can create, configure, and manage ECS clusters and services, as well as monitor the performance and health of those services. Amazon ECS is a container orchestration service that allows users to run and manage Docker containers in the cloud. ECS manages the underlying infrastructure required to run containerized applications, including managing clusters of EC2 instances, scheduling containers onto those instances, and monitoring the health of containers and instances.

A Docker image is a lightweight, standalone, and executable package that contains functionality to run a piece of software, including code, runtime, libraries, system tools, and settings. Docker images are created using a layered file system that includes a base image, which can be customized with additional layers to create a new image. Docker images are typically built using a Dockerfile, which is a text file that contains instructions for building the image. The Dockerfile specifies the base image to use, the application code to copy into the image, any dependencies or system packages needed, and any configuration settings.

Probe agent deployment component 238 is configured to deploy probe agents on workloads in a virtual private network detected by component 234. Examples of probe agent deployment and execution are discussed in further detail below. Briefly, however, a probe agent is configured to detect and analyze network traffic using a scanner engine of the probe agent. A probe agent can be deployed, for example, by pushing an image or script from a control plane. The probe agent detects data packets, performs packet payload extraction, sensitive data detection, and/or telemetry to generate a scan result that is provided to a control plane.

Result detection component 240 is configured to detect the results and provide them to other components, such as breach vulnerability evaluation component 222, cloud security issue identification component 226, and cloud security issue prioritization component 228. Further, the results can be provided to visualization system 208.

Action generator 242 is configured to generate and/or execute computing actions based on the results detected by component 240. Examples of actions include, but are not limited to, storing the results, displaying the results, executing remedial actions (e.g., configuring the workloads) based on the results, etc.

Action generator 242 illustratively includes a traffic graph generator component 245 configured to generate a network traffic graph, which can be stored in any of a variety of formats including, but not limited to, a graph database. One example of a graph database is neo4j.

An example graph database stores a graph database definition and/or other metadata that defines and represents a data model. Nodes have relationships defined by edges, which can connect a given node to one or more other nodes. A node is a unit in the graph that typically represents a unit in the graph, and the relationships can be directed or undirected. Properties, such as key/value pairs, can be assigned to a node or a relationship.

The network traffic graphs can combine traffic scan results from multiple workloads in one or more virtual networks to represent sensitive data movement. In one example, a network traffic graph represents a complete path from data origin to the destination where the data is transmitted to (e.g., copied, queried, etc.). For example, a first node in the graph can represent a first workload in a virtual network, a second node in the graph can represent a second workload in the same virtual network (or a different network), and an edge between the first and second node can represent some or all of the extracted data (e.g., packet payload information, an indication of a data classification, etc.). For instance, the edge can include identifiers (e.g., domain names, internet protocol (IP) addresses, media access control (MAC) address, email addresses, etc.) that identify the second workload as the source of the traffic, the first workload as the destination or receiver of the traffic, which data is included in the traffic, when the data was transmitted, and/or which application is using the data. This, of course, is for sake of example only.

Visualization system 208 is configured to generate visualizations of the cloud security posture from system 206. Illustratively, system 208 includes a user interface component 262 configured to generate a user interface for a user, such as an administrator. In the illustrated example, component 262 includes a web interface generator 264 configured to generate web interfaces that can be displayed in a web browser on a client device.

Visualization system 208 also includes a resource graph generator component 266, a cloud attack surface graph generator component 268, and can include other items 270 as well. Resource graph generator component 266 is configured to generate a graph or other representation of the relationships between resources 127. For example, component 266 can generate a cloud infrastructure map that graphically depicts pairs of compute resources and storage resources as nodes and network communication paths as edges between the nodes.

Cloud attack surface graph generator component 268 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 272 obtained by metadata ingestion component 216, sensitive data profiles 273, probe agent results 274 obtained by system 230, probe agent images 275, network traffic graphs 276 generated by component 245, and can store other items 277 as well.

Examples of sensitive data profiles 273 are discussed in further detail below. Briefly, however, sensitive data profiles 273 can identify target data patterns that are to be categorized as sensitive or conforming to a predefined pattern of interest. Sensitive data profiles 273 can be used as training data for data classification. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Figure 4:
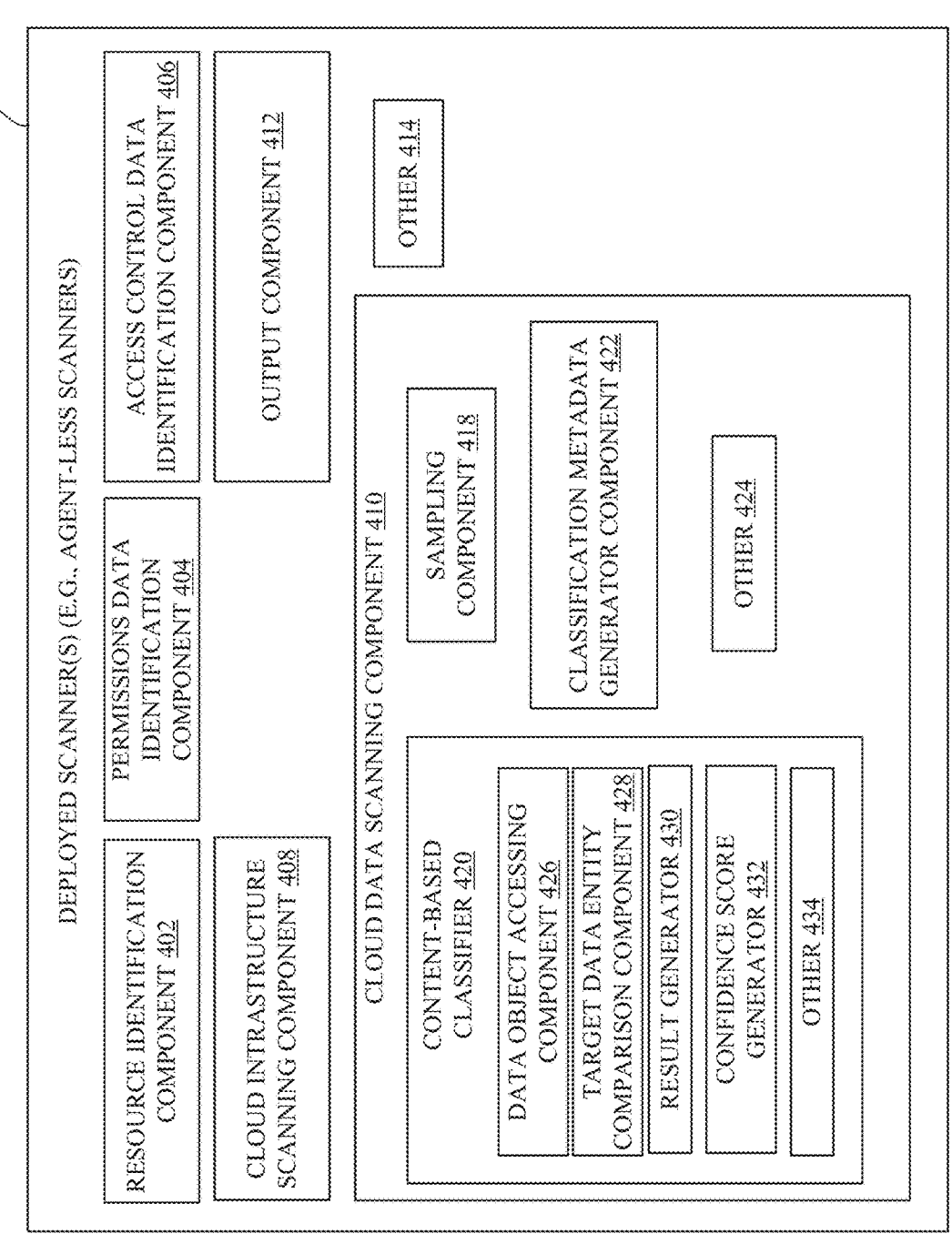
FIG. 4 is a block diagram illustrating one example of a deployed scanner.

FIG. 4 is a block diagram illustrating one example of a deployed scanner 148. Scanner 148 includes a resource identification component 402, a permissions data identification component 404, an access control data identification component 406, a cloud infrastructure scanning component 408, a cloud data scanning component 410, an output component 412, and can include other items 414 as well.

Resource identification component 402 is configured to identify the resources 127 within cloud service 108-1 (and/ or other cloud services 108) and to generate corresponding metadata that identifies these resources. Permissions data identification component 404 identifies the permissions data 136 and access control data identification component 406 identifies access control data 138. Cloud infrastructure scanning component 408 scans the infrastructure of cloud service 108 to identify the relationships between resources 130 and 132 and cloud data scanning component 410 scans the actual data stored in storage resources 132. Output component 412 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Cloud data scanning component 410 includes a sampling component 418, a content-based classifier 420, a classification metadata generator component 422, and can include other items 424 as well. Sampling component 418 is configured to define or otherwise obtain a sampling criterion that is utilized for sampling a data store to be scanned. Using the sampling criterion, scanner 148 selects a representative subset of data objects in the data store to be utilized by scanner 148 in performing content-based classification. Operation of sampling component 418 is discussed in further detail below.

Content-based classifier 420 is configured to perform content-based classification to classify data objects (e.g., data files, etc.) in the data store. Content-based classifier 420 includes a data object accessing component 426, a target data entity comparison component 428, a result generator 430, a confidence score generator 432, and can include other items 434 as well. Data object accessing component 426 is configured to access the data objects.

Content-based classifier 420 can perform content-based classification using target data entity comparison component by comparing the data objects to predefined target data profiles (e.g., sensitive data profiles). The content-based classifier can be any of a wide variety of classifiers including, but not limited to, a rules-based classifier, a machine learned classifier (e.g., a deep learning system), a heuristics-based classifier, or other type of classifier or classification model.

An example classifier includes a classification engine that evaluates extracted content, extracted from the data objects.

For example, a portion of content can be matched to a content rule if a characteristic of the content satisfies a condition of the content rule. For instance, a classifier can compare the extracted content to the target data profiles using one or more similarity measures. A similarity measure can be used by the classifier to determine whether a data item extracted from a content object is determined to match a given target data profile. Examples of similarity measures include, but are not limited to, k-gram overlap, edit distance, Cosine similarity, Manhatten distance, Euclidean distance, Levenshtein distance, to name a few.

Figure 5:
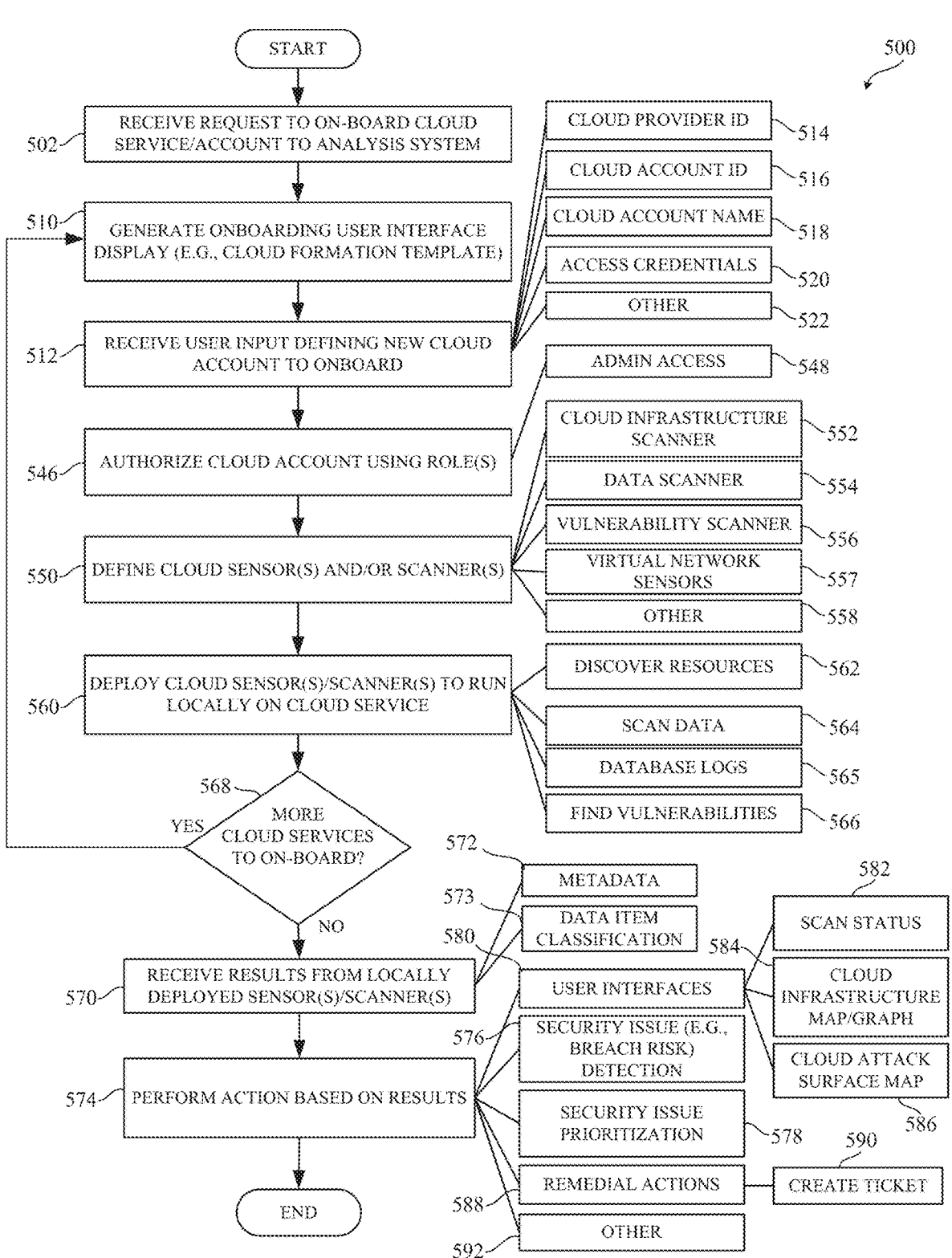
FIG. 5 is a flow diagram showing an example operation of on-boarding a cloud account and deploying one or more scanners.

FIG. 5 is a flow diagram 500 showing an example operation of system 122 in on-boarding a cloud account and deploying one or more scanners. At block 502, a request to on-board a cloud service to cloud security posture analysis system 122 is receives. For example, an administrator can submit a request to on-board cloud service 108-1.

Figure 6:
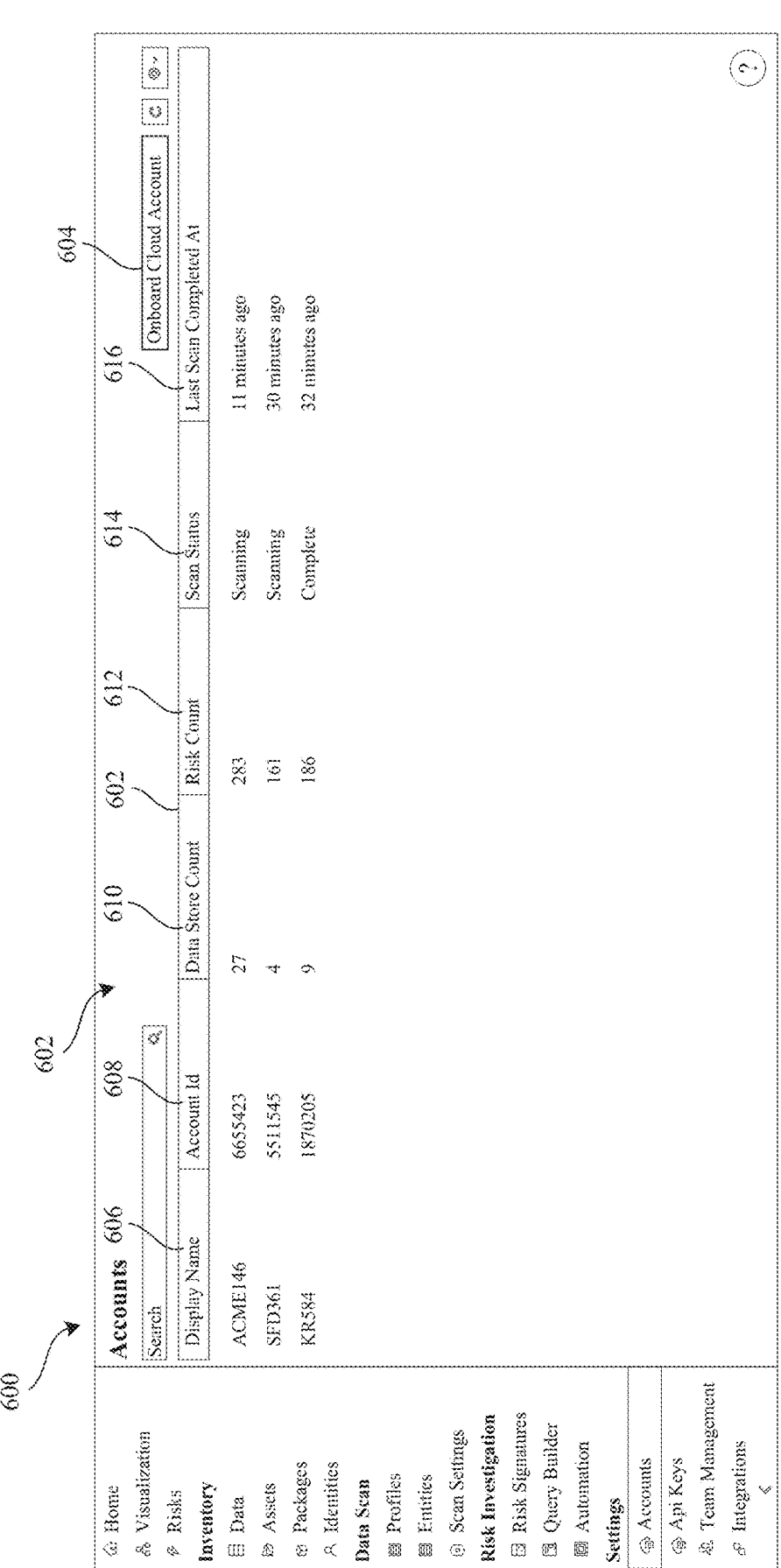
FIG. 6 illustrates one example of a user interface display representing on-boarded cloud accounts.

FIG. 6 illustrates one example of a user interface display 600 provided for an administrator. Display 600 includes a display pane 602 including a number of display elements representing cloud accounts that have been on-boarded to system 122. Display 600 includes a user interface control 604 that can be actuated to submit an on-boarding request at block 502.

Referring again to FIG. 5, at block 510, an on-boarding user interface display is generated. At block 512, user input is received that defines a new cloud account to be on-boarded. The user input can define a cloud provider identification 514, a cloud account identification 516, a cloud account name 518, access credentials to the cloud account 520, and can include other input 522 defining the cloud account to be on-boarded.

Figure 7:
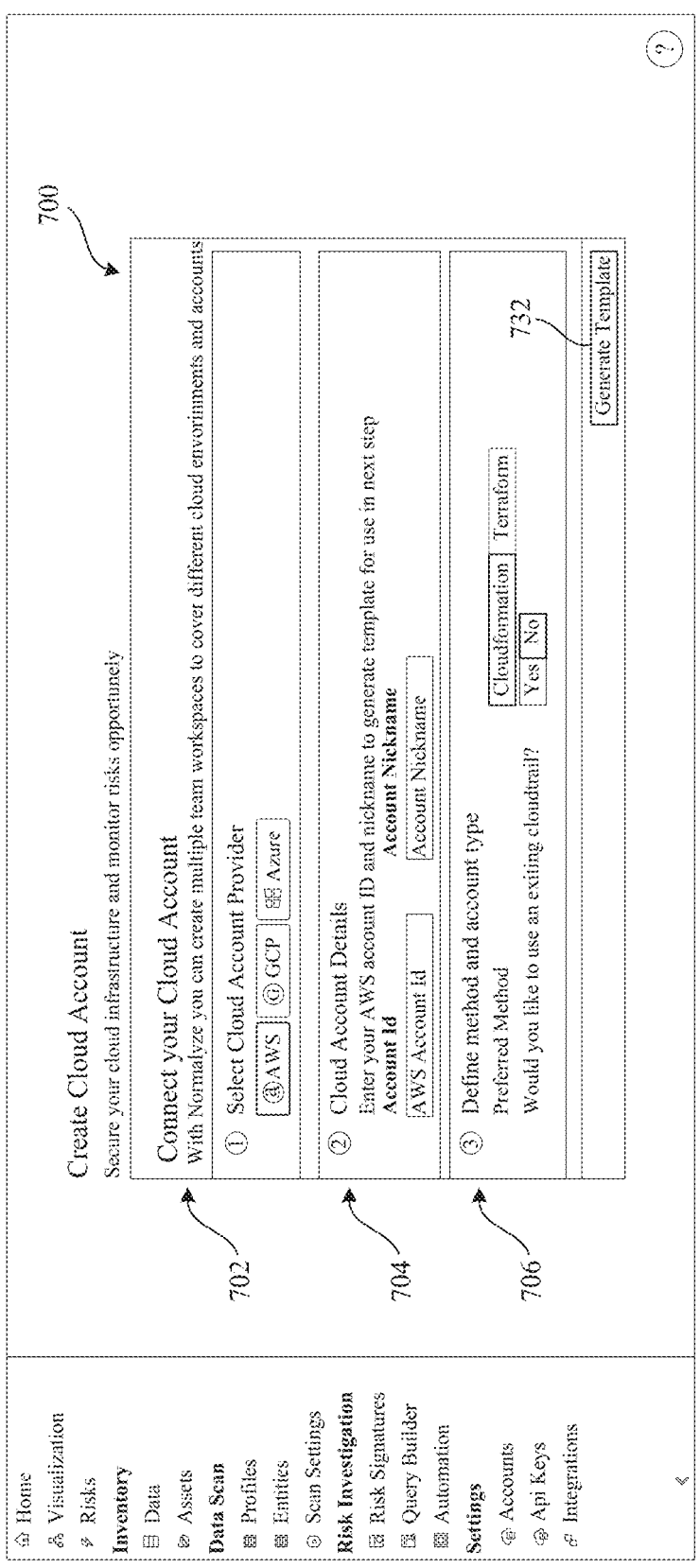
FIG. 7 illustrates one example of an on-boarding user interface display.

FIG. 7 illustrates one example of an on-boarding user interface display 700 that is displayed in response to user actuation of control 604.

Display 700 includes a user interface mechanism 702 configured to receive input to select or otherwise define a particular cloud account provider. In the illustrated example, mechanism 702 includes a plurality of selectable controls representing different cloud providers including, but not limited to, AWS, GCP, Azure.

Display 700 includes a user input mechanism 704 configured to receive input defining a cloud account identifier, and an account nickname. User input mechanisms 706 allow the user to define other parameters for the on-boarding. A user input mechanism 732 is actuated to generate a cloud formation template, or other template, to be used in the on-boarding process based on the selected cloud account provider.

Once the cloud account is connected to system 122, display 600 in FIG. 6 can be updated to show the details of the cloud account as well as the scan status. In FIG. 6, each entry includes a display name 606, an account ID 608, a data store count 610, and a risk count 612. Data store count 610 includes an indication of the number of data stores in the cloud account and the risk count 612 includes an indication of a number if identified security risks. A field 614 indicates the last scan status, such as whether the last scan has completed or whether the scanner is currently in progress or currently scanning. A field 616 indicates the time at which the last scan was completed.

Referring again to FIG. 5, at block 546, the cloud account is authorized using roles. For example, administrator access (block 548) can be defined for the cloud scanner using IAM roles. One or more cloud sensor(s) and/or scanners are defined at block 550 and can include, but are not limited to, cloud infrastructure scanners 552, cloud data scanners 554, vulnerability scanners 556, virtual network activity sensors 557 (e.g., In-VPC activity sensors), or other sensors/scanners 558.

At block 560, the cloud sensors and/or scanners are deployed to run locally on the cloud service, such as illustrated in FIG. 2. The cloud sensors and/or scanners discover resources at block 562, scan data in the resources at block 564, virtual networks at block 565, and can find vulnerabilities at block 566. As discussed in further detail below, a vulnerability can identified based on finding a predefined risk signature in the cloud service resources. The risk signatures can be queried upon, and define expected behavior within the cloud service and locate anomalies based on this data.

At block 568, if more cloud services are to be on-boarded, operation returns to block 510. At block 570, the results from the deployed sensors and/or scanners are received. As noted above, the scan results include metadata (block 572) and/or data item classifications (block 573) generated by the sensors and/or scanners running locally on the cloud service.

At block 574, one or more actions are performed based on the results. At block 576, the action includes security issue detection. For example, a breach risk on a particular resource (such as a storage resource storing sensitive data) is identified. At block 578, security issue prioritization can be performed to prioritize the detected security issues. Examples of security issue detection and prioritization are discussed in further detail below. Briefly, security issues can be detected by executing a query against the results using vulnerability or risk signatures. The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

The action can further include providing user interfaces at block 580 that indicate the scan status (block 582), a cloud infrastructure representation (such as a map or graph) (block 584), and/or a cloud attack surface representation (map or graph) (block 586). The cloud attack surface representation can visualize vulnerabilities.

Remedial actions can be taken at block 588, such as creating a ticket (block 590) for a developer or other user to address the security issues. Of course, other actions can be taken at block 592. For instance, the system can make adjustments to cloud account settings/configurations to address/remedy the security issues.

Figure 8:
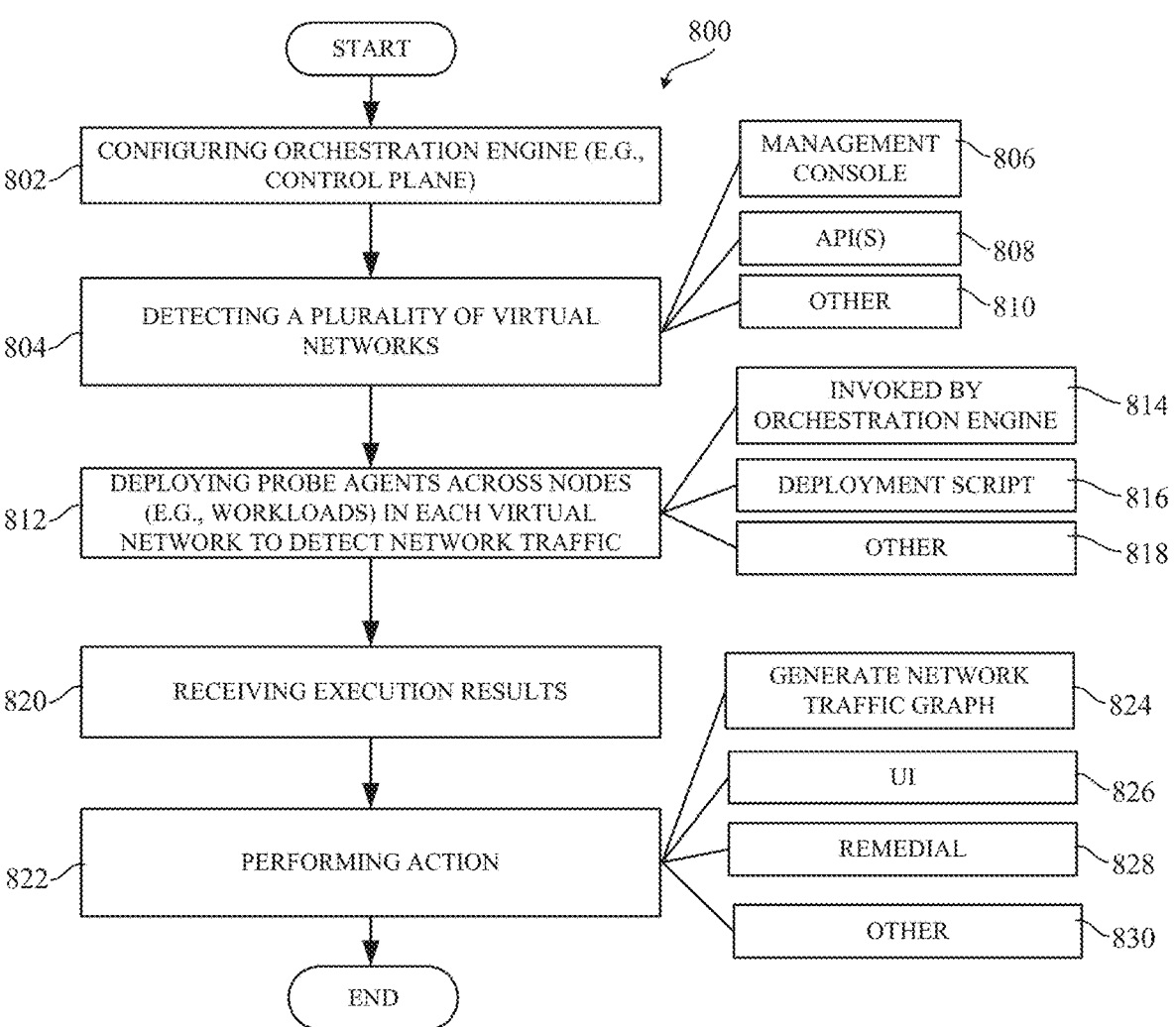
FIG. 8 is a flow diagram illustrating an example operation for probe agent based sensitive data traffic detection in a virtual private cloud or other virtual network in a cloud environment.

FIG. 8 is a flow diagram 800 illustrating an example operation for probe agent based sensitive data traffic detection in a virtual private cloud or other virtual network in a cloud environment. For sake of illustration, but not by limitation, FIG. 8 will be discussed in the context of sensitive data traffic detection system 230 illustrated in FIG. 3.

At block 802, component 236 configures an orchestration engine, such as a control plane backend in the cloud environment. At block 804, a plurality of virtual networks are detected in the cloud environment by virtual network detection component 234. For example, the virtual networks are detected using a management console of the cloud provider, as indicated by block 806. Alternatively, or in addition, the virtual networks can be detected through cloud provider APIs, as represented at block 808. Of course, the virtual networks can be detected in other ways as well, as represented at block 810.

At block 812, probe agents are deployed across nodes (e.g., workloads) in each virtual network to detect network traffic on those nodes. For example, the executable package can include predefined configuration files or scripts. The executable package can be deployed in a containerized environment. Examples of probe agents are discussed in further detail below.

In one example, at block 814 probe agents are invoked in one or more of the workloads by the orchestration engine. Alternatively, or in addition, at block 816 probe agents are deployed to one or more of the workloads by defining a deployment script that is executed on the virtual network(s). Of course, probe agents can be deployed in other ways as well, as represented at block 818.

At block 820, execution results are received indicative of execution of the probe agents. For example, an execution result includes a scan result from a probe agent, the scan result including packet payload information and an indication of a data classification (e.g., whether the packet includes sensitive and/or private data).

At block 822, one or more actions can be performed based on the execution results. For example, the actions can include generating a network traffic graph at block 824, generating a user interface display at block 826, performing a remedial action at block 828, or other actions at block 830.

Figure 9:
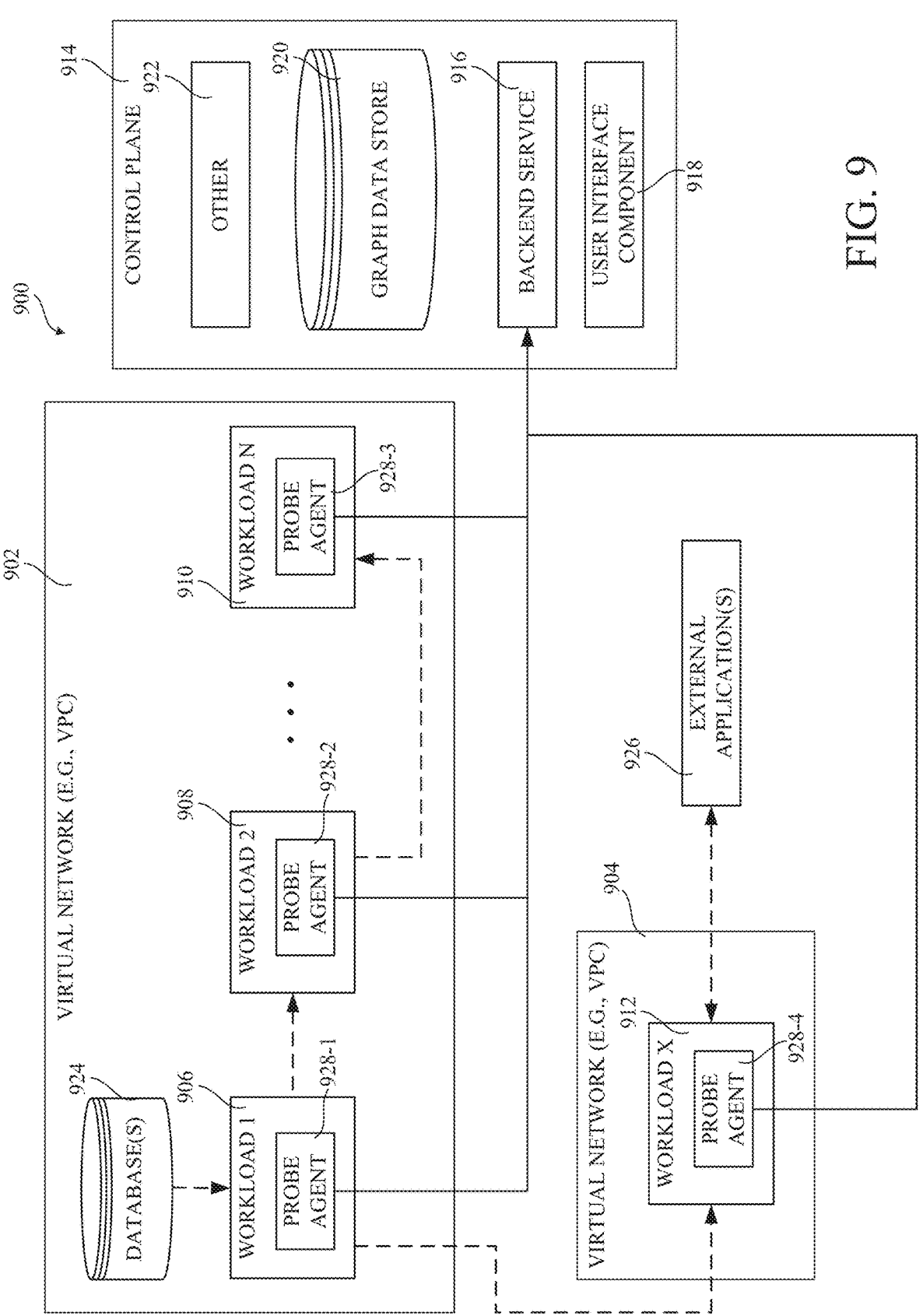
FIG. 9 is a schematic diagram illustrating an example cloud environment in which probe agents are deployed.

FIG. 9 is a schematic diagram illustrating an example cloud environment 900 in which probe agents are deployed. For sake of illustration, but not by limitation, FIG. 9 will be discussed in the context of system 230 illustrated above with respect to FIG. 3.

Cloud environment 900 includes a plurality of virtual networks 902, 904, etc. Each virtual network includes one or more workloads. Illustratively, virtual network 902 includes workloads 906, 908, 910, and virtual network 904 includes workload 912. An example virtual network includes a virtual private cloud (VPC). Further, examples of workloads include, but are not limited to, physical machines, virtual machines, databases, data centers, etc. The workloads are also referred to as nodes in the respective virtual networks.

A control plane 914 includes a backend service 916, a user interface component 918, a graph data store 920, and can include other items 922 as well. Backend service 916 is configured to control deployment of probe agents on the workloads and receive scan results from the probe agents, analyze the scan results, and store results in data store 920. Also, user interface component 918 can generate user interface displays indicative of the results, such as sensitive data in or the subject of detected network traffic to and/or from the workloads.

The dashed lines in FIG. 9 illustrate example flow of network traffic, which is also referred to as data-in-motion. For example, workload 906 can obtain data from database 924. Further, workload 908 can obtain data from workload 906, such as by copying data, querying a database, etc. FIG. 9 also illustrates that one or more external applications 926, that are outside the virtual network, can access data from a workload in the virtual network.

Each probe agent 928-1, 928-2, 928-3, 928-4 (collectively referred to as probe agents 928) is configured to analyze network traffic in a native cloud environment through deployment on the workloads. The probe agents 928 are configured to intercept data packets, inspect packet payload, and detect sensitive data, and to provide results to backend service 916. Further, probe agents 928 are configured for dynamic filtering through code configured to inspect the data packet and make decisions as to how the data packets are to be handled in real-time, based on packet payload content and/or other factors. This is advantageous in cloud native environments where traffic patterns can be highly dynamic and unpredictable. It is noted that this is in contrast to use of static rules to filter network traffic, such as that used in traditional firewalls, which is highly inflexible. Examples of implementation of the present technology provides fine-grained visibility into the network traffic without requiring a centralized proxy, and can intercept and analyze both unencrypted traffic and encrypted traffic.

One example of a probe agent uses extended Berkeley Packet Filter (eBPF) technology to analyze network traffic. The eBPF probe is deployed on a workload and intercepts data packets and inspects packet payload for sensitive data. Further, the eBPF probe can utilize a virtual machine to capture and filter network packets, for example utilizing programmable hooks (programs) at various points in a kernel, which enables custom processing of packets, events, and data in real-time. An eBPF program can be attached to a specific network hook or interface to collect and analyze network data. One example of a probe agent 1000 is illustrated in FIG. 10.

Figure 10:
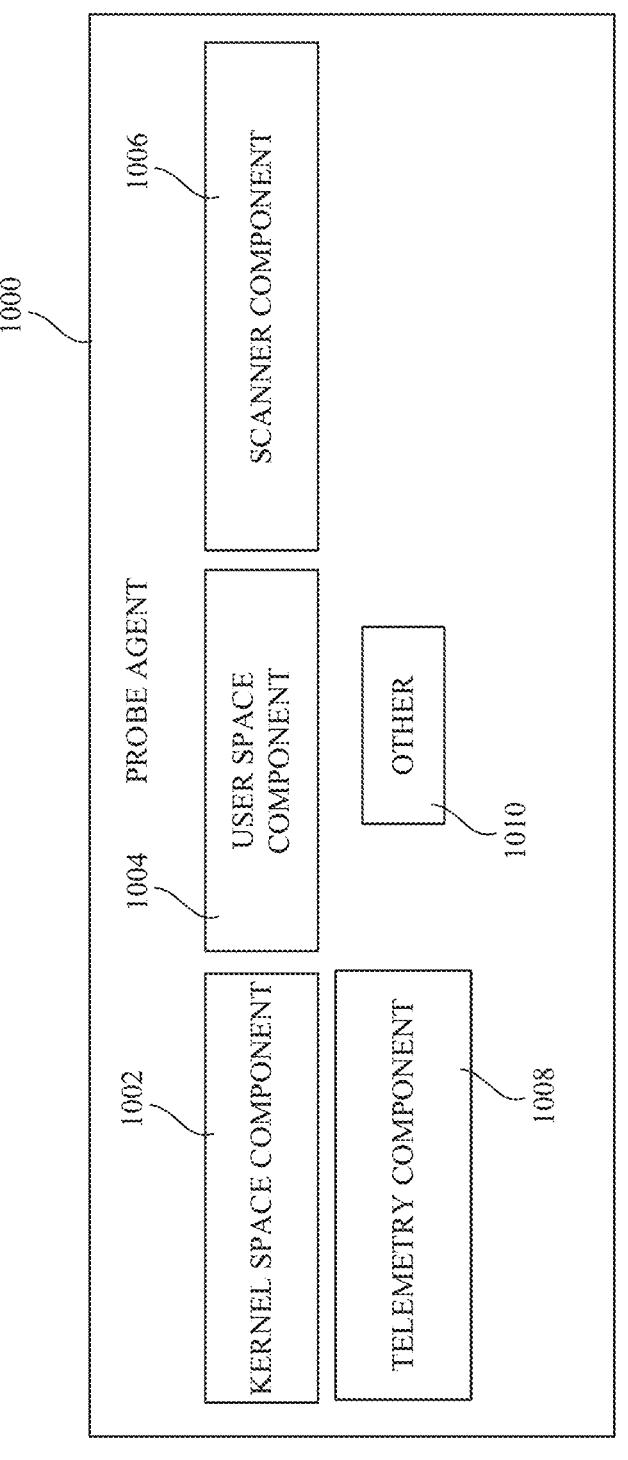
FIG. 10 is a schematic diagram of an example probe agent.

As shown in FIG. 10, probe agent 1000 includes a kernel space component 1002, a user space component 1004, a scanner component 1006, a telemetry component 1008, and can include other items as well, as represented at block 1010.

In one example, kernel space component 1002 and user space component 1004 are types of tracing mechanisms (e.g., in a Linux kernel) that utilize eBPF technology, and can allow developers to dynamically instrument and trace kernel and user-space code without the need for recompilation or modification of the source code.

Kernel space component 1002 is configured to run code in a host kernel space (e.g., Kernel Probes, also referred to Kprobe code), such as to listen on send( ) and recv( ) system calls to intercept traffic (e.g., regular TCP (transmission control protocol)/UDP (user data gram protocol) traffic). TCP and UDP traffic refer to the data packets transmitted using these protocols. TCP traffic consists of packets adhering to the TCP protocol, while UDP traffic consists of packets adhering to the UDP protocol. These packets contain application data, along with header information necessary for routing and delivery, such as source and destination IP addresses, port numbers, and protocol type. A Kprobe can be attached to specific kernel functions or to individual instructions.

User space component 1004 is configured to run code in a host user space (e.g., Uprobes code), which can include capturing SSL traffic before the traffic is encrypted using trace and read function calls. Uprobes are directed to user-space instrumentation, and can allow for the insertion of probes into user-space applications. Uprobes can be attached to user-space functions such that when the functions are executed, the associated probe handlers are triggered. Uprobes can facilitate the dynamic instrumentation and observation of user-space program behavior by attaching eBPF handlers to any memory address, typically the entry point of a function.

Scanner component 1006 is configured to extract a packet payload and scan the extracted packet payload to detect sensitive data in the network traffic. For example, an image or script pushed from control plane 914 can define or otherwise represent sensitive data profiles 273. The images (e.g., images 275) can be obtained from data store 210 and can include or otherwise represent sensitive data profiles 273.

Telemetry component 1008 is configured to collect and transmit data for example to track performance and identify issues in the workloads. For example, telemetry component 1008 can capture data from probes attached to kernel functions (e.g., Kprobes) or user-space applications (e.g., Uprobes). The collected data can include function calls, parameters, return values, timestamps, and other relevant information.

In one example, once collected, the raw data is processed to extract meaningful insights, which can involve filtering, aggregation, and transformation of the data, to preprocess the data for further analysis. Telemetry component 1008 can analyze the processed data to identify patterns, trends, anomalies, and performance bottlenecks.

Figure 11:
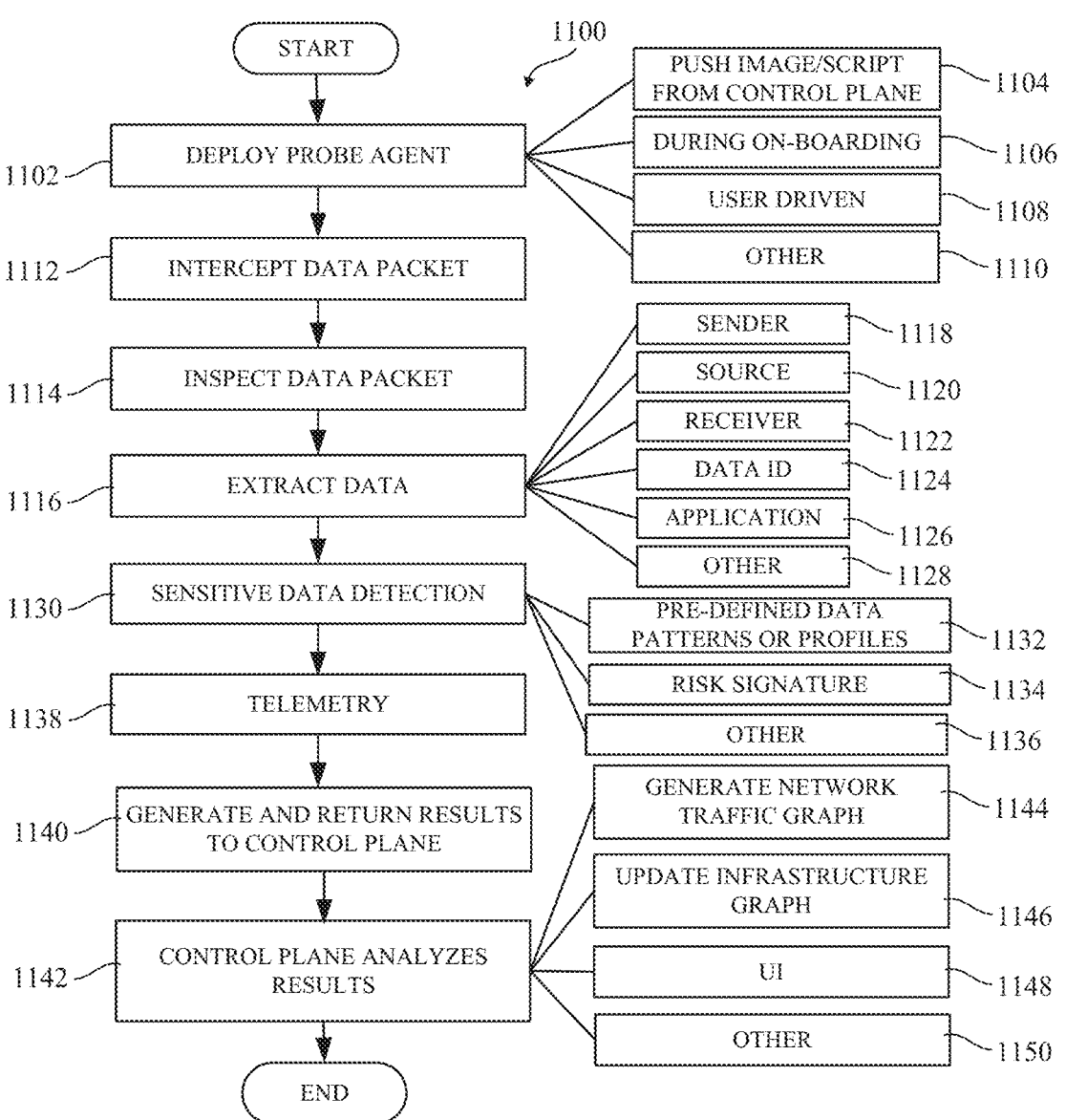
FIG. 11 is a flow diagram illustrating one example of deploying a probe agent to detect sensitive data in a virtual private network based on detected network traffic.

FIG. 11 is a flow diagram 1100 illustrating one example of deploying a probe agent to detect movement of sensitive data in a virtual private network based on detected network traffic. For sake of illustration, but not by limitation, FIG. 11 will be discussed in the context of FIG. 9.

At block 1102, a probe agent (e.g., probe agent 928-1) is deployed on a workload (e.g., workload 906). Deploying the probe agent at block 1102 can be done in any of a number of ways. For example, an image or script can be pushed from control plane 914, as represented at block 1104. The probe agent can be deployed during onboarding, as represented at block 1106. Alternatively, or in addition, probe agent deployment can be user-driven, as represented at block 1108. For example, a user can initiate probe deployment to a specific workload. Of course, the probe agent can be deployed in other ways as well, as represented at block 1110.

At block 1112, the probe agent operates to intercept a data packet, and inspects the data packet at block 1114. The probe agent extracts data from the data packet at block 1116. The extracted data can include, but is not limited to, sender data (block 1118), source data (block 1120), receiver data (block 1122), data identification (block 1124), application information (block 1126), and can include other data as well, as represented at block 1128.

Sender data can indicate an entity (such as a workload, an external application, etc.) that sent the data packet. Source information can indicate a source of the data in the data packet, and receiver data can indicate the entity (such as the workload) that received the data packet. Data identification information can identify the data in the data packet, and application information can indicate the application that is to use or otherwise access the information.

At block 1130, the probe agent performs sensitive data detection based on the data extracted from the data packet. For example, the probe agent can perform matching of the extracted data to one or more predefined data patterns or profiles, such as data profiles that represent sensitive and/or private data types. Examples include, but are not limited to, personally identifiable information (PII), protected health information (PHI), payment card information (PCI), financial information, tax information, or other types of sensitive data types. Examples include various types of financial data, such as, but not limited to, credit card numbers, bank account numbers, etc. and/or personal information, such as social security numbers, phone numbers, email addresses, etc.

Also, at block 1134, the probe agent can apply one or more risk signatures to the extracted data to identify instances of risks. Of course, sensitive data can be detected in other ways as well, as represented at block 1136.

At block 1132, the probe agent can perform telemetry based on the extracted data. Examples of telemetry are discussed above.

At block 1140, the probe agent generates and returns results to control plane 914. At block 1142, the control plane can analyze the results and perform actions. For example, at block 1144, a network traffic graph can be generated. In another example, an infrastructure graph can be updated 1146 to indicate detected sensitive data.

Alternatively, or in addition, at block 1148 a user interface display can be generated and rendered to a user. The user interface display can display the network traffic graph generated at block 1144.

Of course, other actions can be performed as well, as represented at block 1150.

Figure 12:
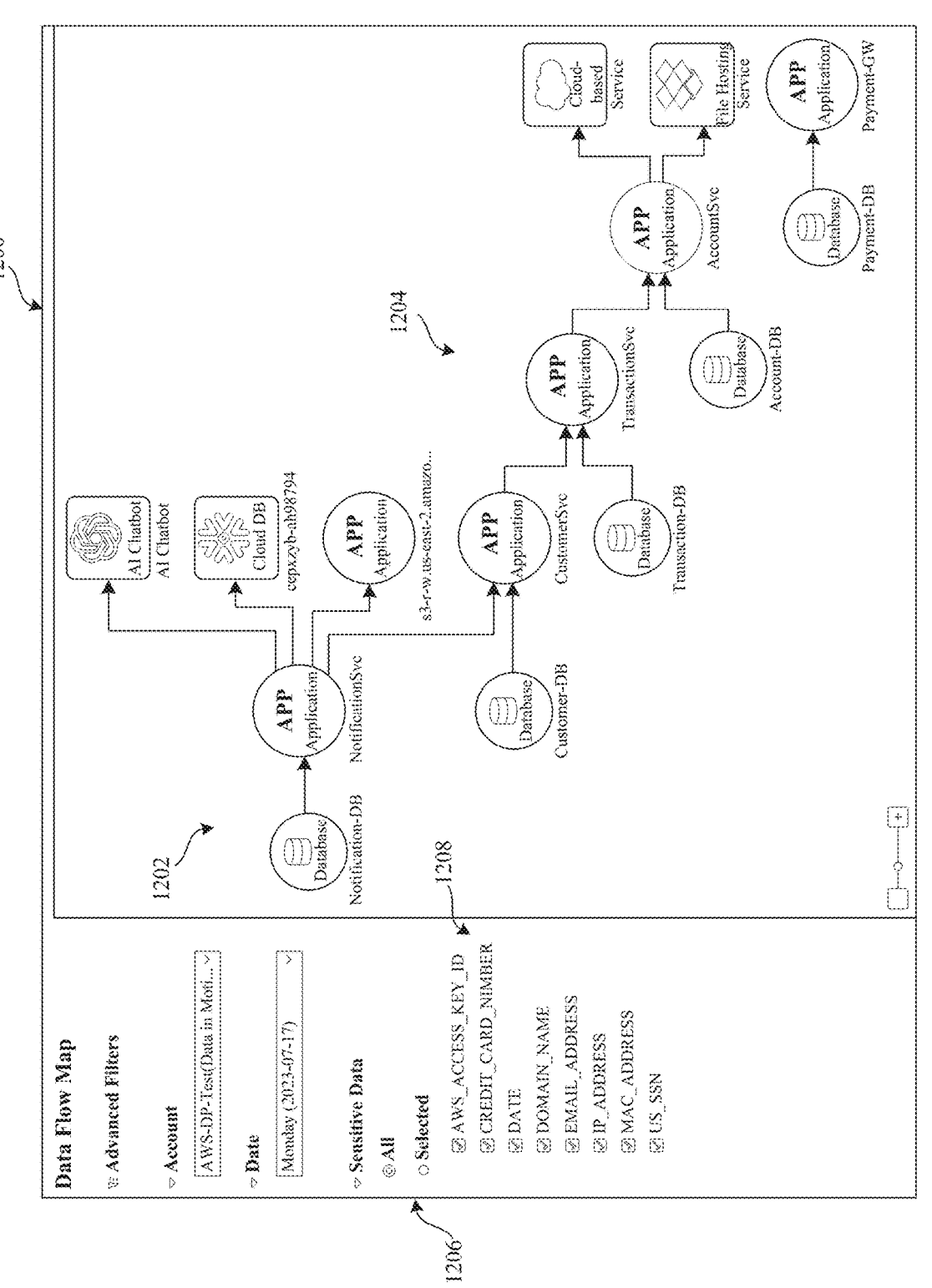
FIG. 12 illustrates one example of a user interface display.
Figure 13:
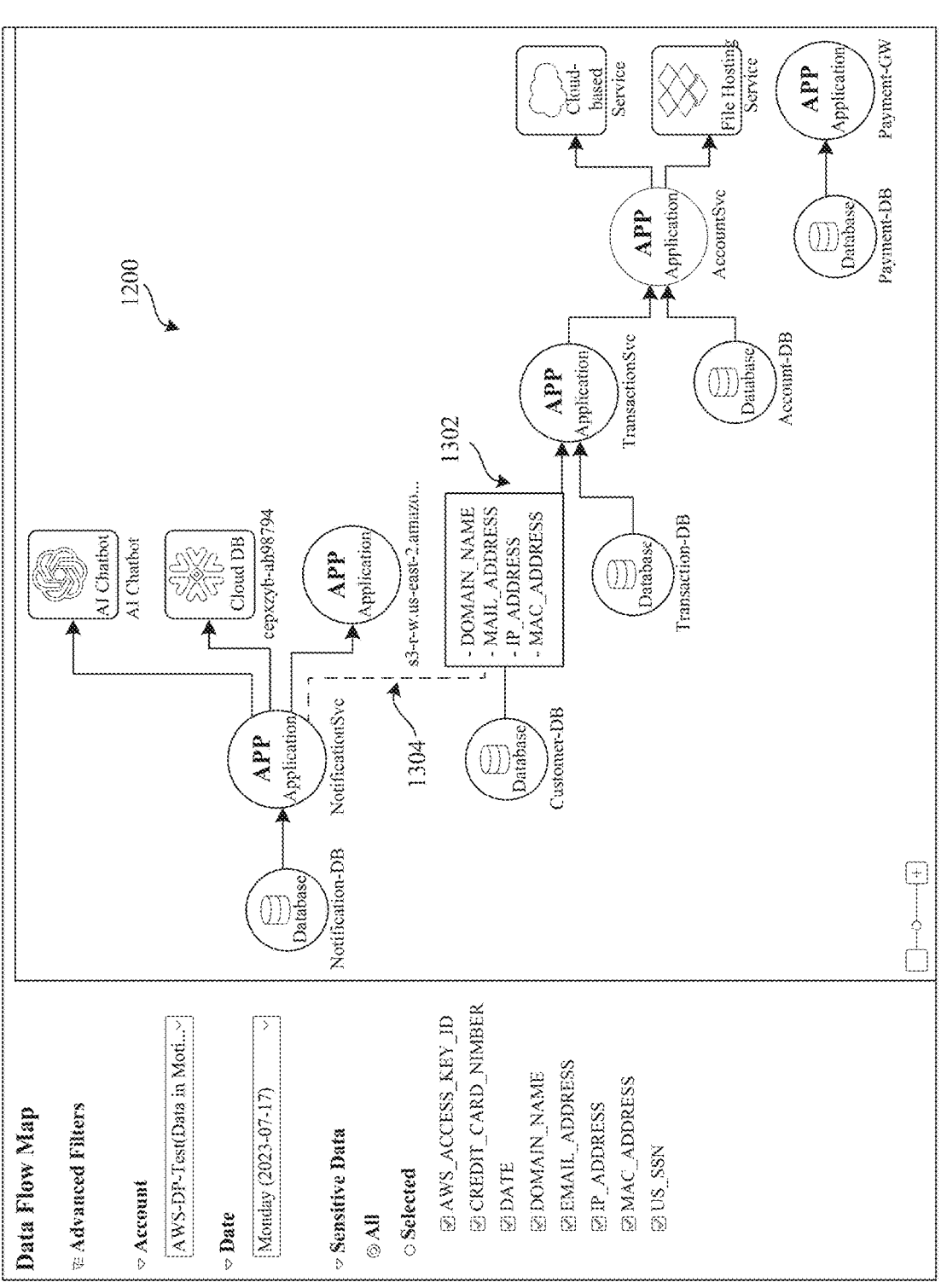
FIG. 13 illustrates one example of a user interface display.

FIG. 12 illustrates one example of a user interface display 1200 that can be generated at block 1148. Display 1200 includes a network traffic graph 1202, that indicates traffic (e.g., data packets) between workloads and/or external applications. Graph 1202 includes a number of display elements 1204, each representing workloads, connected by edges or links that show traffic between the nodes. In one example, each link can be actuated, such as hovering a cursor over the link, to display additional details indicating the sensitive data that is moving along the link. One example is illustrated in FIG. 13. As shown in FIG. 13, a display element 1302 is generated in response to a user selecting link 1304.

Referring again to FIG. 12, display 1200 includes a filter pane 1206 that allows a user to filter by types of sensitive data. A list 1208 indicates a plurality of different types of sensitive data that is detected in the network traffic and, for each type, a user interface control (illustratively a check box) that allows a user to toggle display of the corresponding type of sensitive data within graph 1202.

It can thus be seen that the present disclosure provides technology for detecting network traffic within cloud environments. The technology uses probe agents deployed on workloads to detect data packets received by the workloads, and to parse and analyze the data packets to detect sensitive data. This improves security, especially in terms of intra-network activity, to detect sensitive data movement within virtual networks. This can improve security within the cloud environment.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms.

For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

As used herein, if a description includes "one or more of" or "at least one of" followed by a list of example features with a conjunction "or" between the penultimate example feature and the last example feature, then this is to be read such that (1) one example includes at least one of or one or more of each feature of the listed features, (2) another example includes at least one of or one or more of only one feature of the listed features, and (3) another example includes some combination of the listed features that is less than all of the features and more than one of the features.

As used herein, if a description includes "one or more of" or "at least one of" followed by a list of example features with a conjunction "and" between the penultimate example feature and the last example feature, then this is to be read such that the example includes at least one of or one or more of each feature of all the listed features.

As used herein, if a description includes "one or more of" or "at least one of" followed by a list of example features with a conjunction "and/or" between the penultimate example feature and the least example feature, then this is to be read such that, in one example, the description includes "one or more of" or "at least one of" followed by a list of example features with a conjunction "or" between the penultimate example feature and the last example feature, and, in another example, the description includes "one or more of" or "at least one of" followed by a list of example features with a conjunction "and" between the penultimate example feature and the last example feature.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
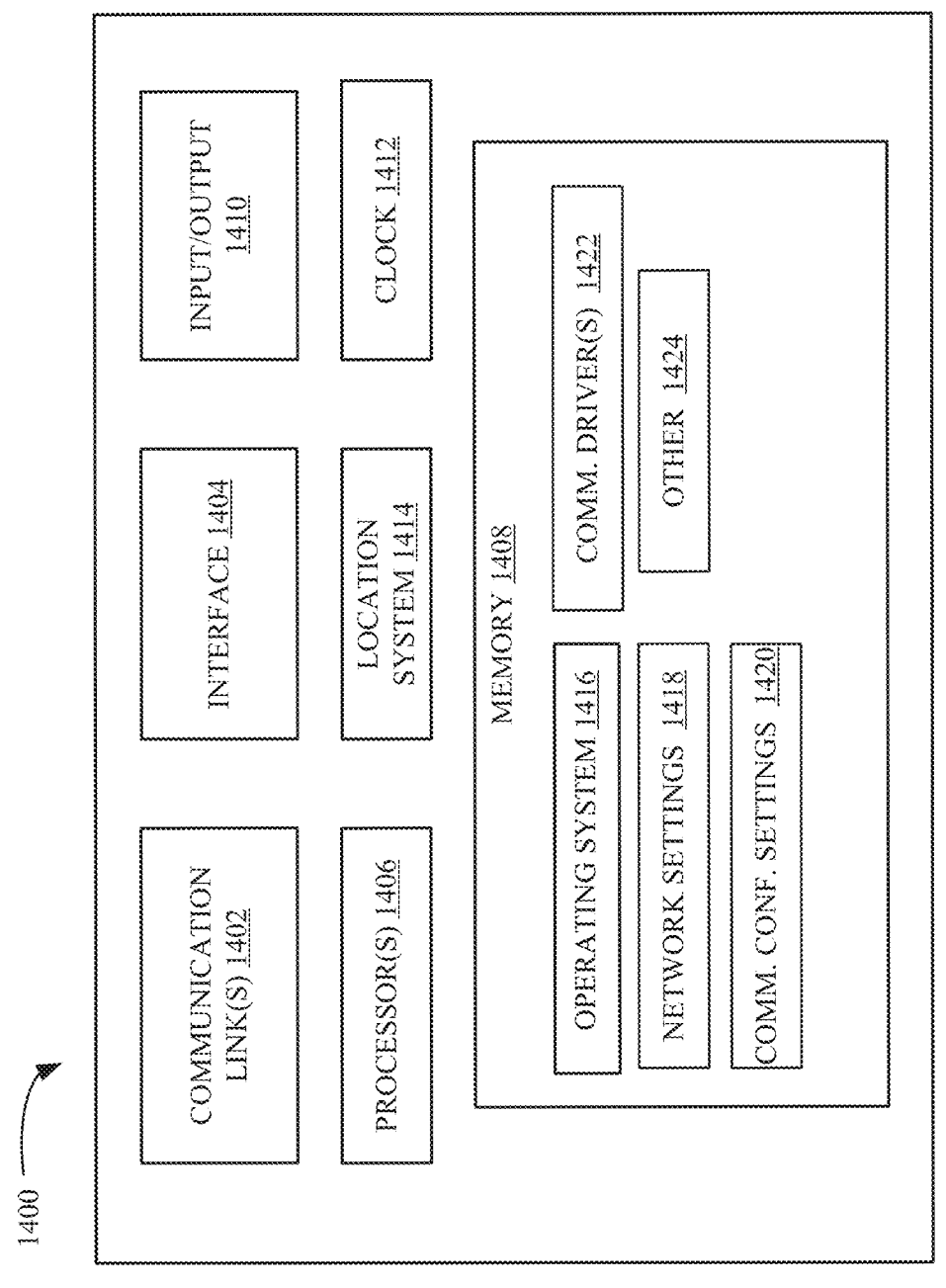
FIG. 14 is a simplified block diagram of one example of a client device.
Figure 15:
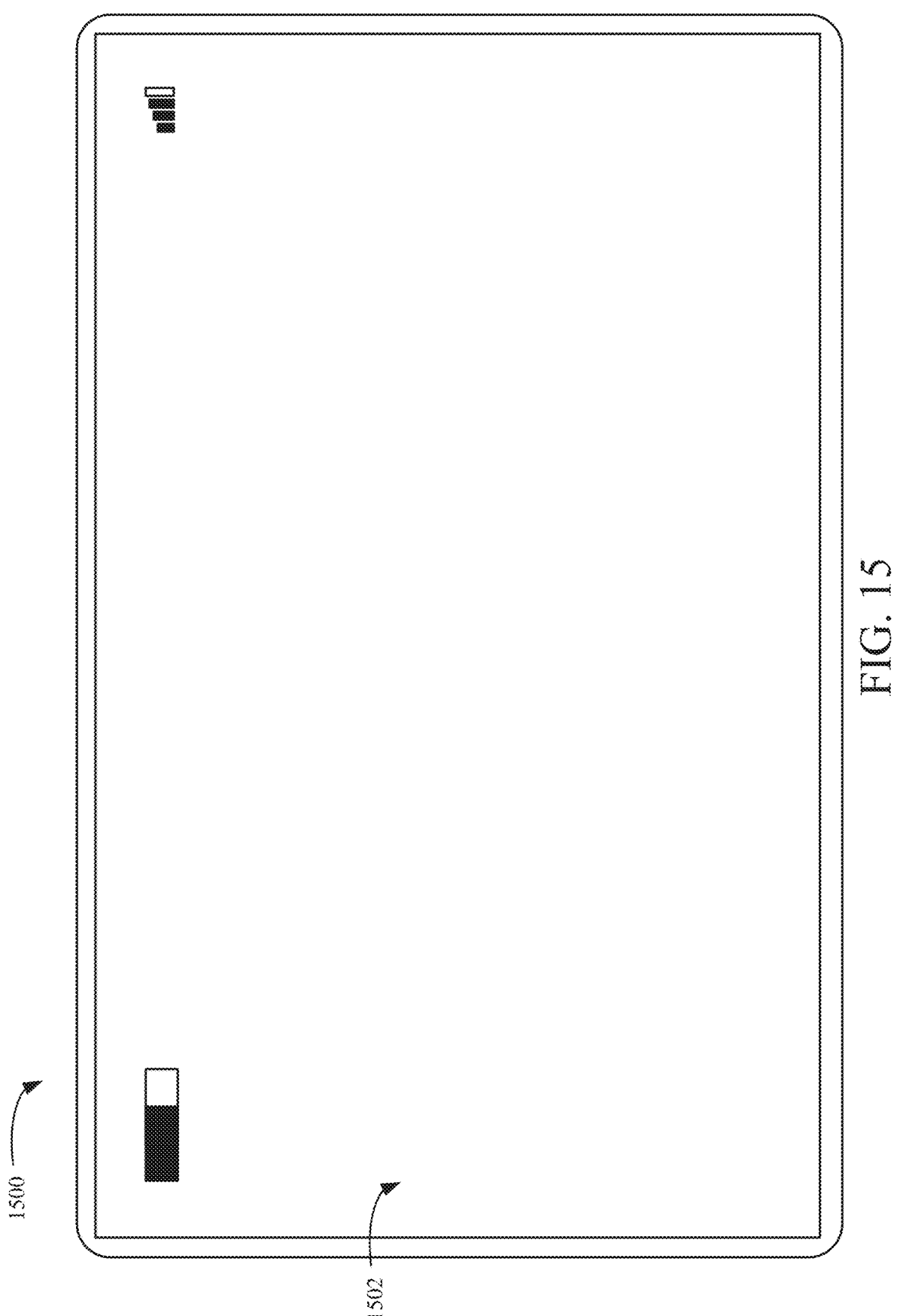
FIG. 15 illustrates an example of a handheld or mobile device.

FIG. 14 is a simplified block diagram of one example of a client device 1400, such as a handheld or mobile device, in which the present system (or parts of the present system) can be deployed. FIG. 15 illustrates an example of a handheld or mobile device.

One or more communication links 1402 allows device 1400 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1404. Interface 1404 and communication links 1402 communicate with one or more processors 1406 (which can include processors or servers described with respect to the figures) along a communication bus (not shown in FIG. 14), that can also be connected to memory 1408 and input/output (I/O) components 1410, as well as clock 1412 and a location system 1414.

Components 1410 facilitate input and output operations for device 1400, and can include input components such as microphones, touch screens, buttons, touch sensors, optical sensors, proximity sensors, orientation sensors, accelerometers. Components 1410 can include output components such as a display device, a speaker, and or a printer port.

Clock 1412 includes, in one example, a real time clock component that outputs a time and date, and can provide timing functions for processor 1406. Location system 1414 outputs a current geographic location of device 1400 and can include a global positioning system (GPS) receiver, a LORAN system, a dead reckoning system, a cellular triangulation system, or other positioning system. Memory 1408 stores an operating system 1416, network applications and corresponding configuration settings 1418, communication configuration settings 1420, communication drivers 1422, and can include other items 1424. Examples of memory 1408 include types of tangible volatile and non-volatile computer-readable memory devices. Memory 1408 can also include computer storage media that stores computer readable instructions that, when executed by processor 1406, cause the processor to perform computer-implemented steps or functions according to the instructions. Processor 1406 can be activated by other components to facilitate functionality of those components as well.

FIG. 15 illustrates one example of a tablet computer 1500 having a display screen 1502, such as a touch screen or a stylus or pen-enabled interface. Screen 1502 can also provide a virtual keyboard and/or can be attached to a keyboard or other user input device through a mechanism, such as a wired or wireless link. Alternatively, or in addition, computer 1500 can receive voice inputs.

Figure 16:
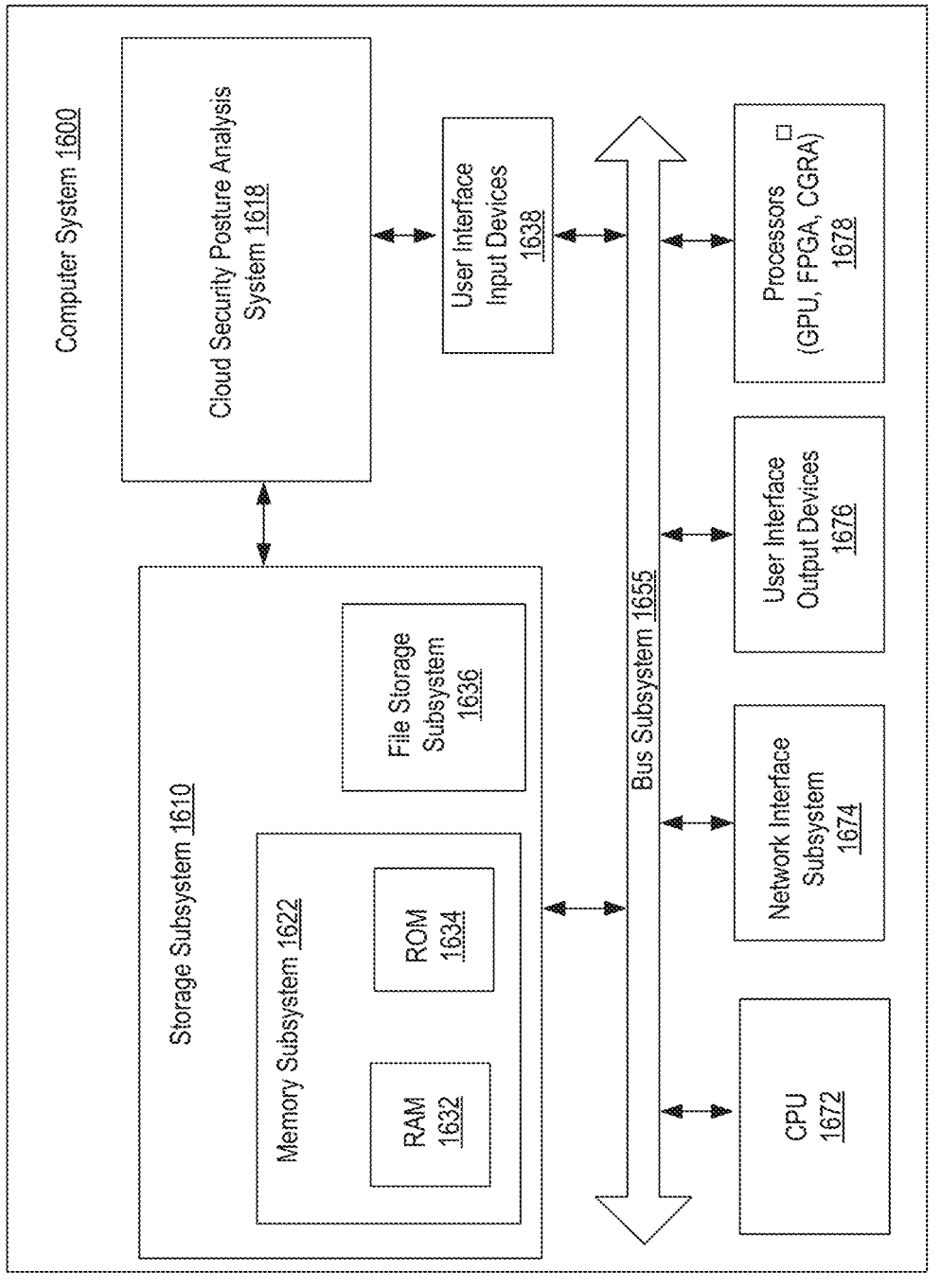
FIG. 16 shows an example computer system.

FIG. 16 shows an example computer system 1600 that can be used to implement the technology disclosed. Computer system 1600 includes at least one central processing unit (CPU) 1672 that communicates with a number of peripheral devices via bus subsystem 1655. These peripheral devices can include a storage subsystem 1610 including, for example, memory devices and a file storage subsystem 1636, user interface input devices 1638, user interface output devices 1676, and a network interface subsystem 1674. The input and output devices allow user interaction with computer system 1600. Network interface subsystem 1674 provides an interface to outside networks, including an interface to corresponding interface devices in other computer systems.

In one implementation, cloud security posture analysis system 1618 is communicably linked to the storage subsystem 1610 and the user interface input devices 1638.

User interface input devices 1638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1600.

User interface output devices 1676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1600 to the user or to another machine or computer system.

Storage subsystem 1610 stores programming and data constructs that provide the functionality of some or all of the modules and methods described herein. These software modules are generally executed by processors 1678.

Processors 1678 can be graphics processing units (GPUs), field-programmable gate arrays (FPGAs), application-specific integrated circuits (ASICs), and/or coarse-grained reconfigurable architectures (CGRAs). Processors 1678 can be hosted by a deep learning cloud platform such as Google Cloud Platform™, Xilinx™, and Cirrascale™. Examples of processors 1678 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1622 used in the storage subsystem 1610 can include a number of memories including a main random access memory (RAM) 1632 for storage of instructions and data during program execution and a read only memory (ROM) 1634 in which fixed instructions are stored. A file storage subsystem 1636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1636 in the storage subsystem 1610, or in other machines accessible by the processor.

Bus subsystem 1655 provides a mechanism for letting the various components and subsystems of computer system 1600 communicate with each other as intended. Although bus subsystem 1655 is shown schematically as a single bus, alternative implementations of the bus subsystem can use multiple busses.

Computer system 1600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1600 depicted in FIG. 16 is intended only as a specific example for purposes of illustrating the preferred implementations of the present invention. Many other configurations of computer system 1600 are possible having more or less components than the computer system depicted in FIG. 16.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system having one or more processors, the method comprising:
   detecting a plurality of workloads in a virtual network in a computing environment;
   deploying a plurality of probe agents to the plurality of workloads, wherein each respective probe agent of the plurality of probe agents,
      detects a data packet in network traffic on a respective workload of the plurality of workloads, the data packet being at least one of:
         sent by the respective workload to another workload in the virtual network, or
         received by the respective workload from another workload in the virtual network,
      scans the data packet to extract a packet payload from the data packet, and
      generates a data classification of the packet payload in response to a determination that the packet payload includes at least one instance of one or more predefined data patterns of a target data type, the target data type comprising at least one of a sensitive data type or a private data type;
   receiving a scan result from a respective agent of the plurality of probe agents, wherein the scan result includes a representation of the respective packet payload scanned by the respective probe agent and the data classification of the respective packet payload; and
   performing a computing action based on the scan result.

2. The method of claim 1, wherein the computing environment comprises a cloud environment, and the virtual network comprises a virtual private network comprising a logical grouping of resources that are operationally isolated from one or more other virtual networks in the cloud environment.

3. The method of claim 2, wherein the virtual network comprises a virtual private cloud (VPC).

4. The method of claim 3, and further comprising identifying traffic paths between the plurality of workloads in the virtual private cloud, wherein performing a computing action comprises generating a graph representation of the traffic paths, wherein the graph representation comprises a first node representing a first workload, a second node representing a second workload, and an edge between the first node and second node, the edge representing the data classification of a respective packet payload.

5. The method of claim 3, wherein the data packet comprises at least one of a data copy operation or a data query operation.

6. The method of claim 1, wherein each respective probe agent of the plurality of probe agents comprises a program attached to one or more probe points in at least one of a kernel or user-space application in the respective workload.

7. The method of claim 6, wherein each respective probe agent of the plurality of probe agents comprises:
   kernel probe code that runs in a host kernel space of the respective workload and is configured to intercept data packets transmitted using a transport layer protocol;
   user space probe code that runs in a host user space of the respective workload and is configured to intercept the network traffic prior to encryption;
   a scanner engine configured to extract the packet payload; and
   a telemetry component configured to perform one or more telemetry functions based on the packet payload.

8. The method of claim 7, wherein each respective probe agent of the plurality of probe agents comprises an extended Berkeley Packet Filter (eBPF) probe.

9. The method of claim 1, wherein deploying the plurality of probe agents comprises at least one of:
   invoking, by an orchestration engine in a control plane, a computing service in each respective workload of the plurality of workloads, or
   defining a deployment script configured to deploy each probe agent of the plurality of probe agents.

10. The method of claim 1, wherein
   the respective workload comprises at least one of a virtual machine, a data center, an application, or a computing service, and
   the data packet is communicated between the respective workload and another workload.

11. The method of claim 1, wherein the scan of the data packet to extract the packet payload and the generation of the data classification are performed by one or more resources on the respective workload.

12. A computing system comprising:
   at least one processor; and
      memory storing instructions executable by the at least one processor, wherein the instructions, when executed, cause the computing system to:
         detect a plurality of workloads in a virtual network in a computing environment, the plurality of workloads being operationally isolated from one or more other virtual networks in the computing environment;

deploy a plurality of probe agents to the plurality of workloads, wherein each respective probe agent of the plurality of probe agents is configured to:

detect a data packet in network traffic on a respective workload of the plurality of workloads, the data packet being at least one of:

sent by the respective workload to another workload in the virtual network, or received by the respective workload from another workload in the virtual network, scan the data packet to extract a packet payload from the data packet, and generate a data classification of the packet payload in response to a determination that the packet payload includes at least one instance of one or more pre-defined data patterns of a target data type, the target data type comprising at least one of a sensitive data type or a private data type;

receive a scan result from a respective agent of the plurality of probe agents, wherein the scan result includes a representation of the respective packet payload scanned by the respective probe agent and the data classification of the respective packet payload; and perform a computing action based on the scan result.

13. The computing system of claim 12, wherein the computing environment comprises a cloud environment, and the virtual network comprises a virtual private cloud.

14. The computing system of claim 12, wherein the plurality of workloads comprises a first workload in the virtual network and a second workload in the virtual network, and wherein the network traffic on the second workload comprises data movement between the first workload to the second workload.

15. The computing system of claim 14, wherein the instructions, when executed, cause the computing system to:

identify a traffic path from the first workload to the second workload; and generate a graph representation of the traffic path, wherein the data movement comprises at least one of a data copy operation or a data query operation, wherein the graph representation comprises a first node representing the first workload, a second node representing the second workload, and an edge between the first node and second node, the edge representing the data classification of a respective packet payload.

16. The computing system of claim 12, wherein the target data type comprises one or more of a sensitive data type or a private data type, and each respective probe agent of the plurality of probe agents comprises a program attached to one or more probe points in at least one of a kernel or user-space application in the respective workload.

17. The computing system of claim 16, wherein each respective probe agent of the plurality of probe agents comprises:

kernel probe code that runs in a host kernel space of the respective workload and is configured to intercept data packets transmitted using a transport layer protocol;

user space probe code that runs in a host user space of the respective workload and is configured to intercept the network traffic prior to encryption;

a scanner engine configured to extract the packet payload; and a telemetry component configured to perform one or more telemetry functions based on the packet payload.

18. A computing system comprising:

at least one processor;

memory storing instructions executable by the at least one processor, wherein the instructions, when executed, provide:

a probe agent deployment component configured to deploy a probe agent to a first workload in a virtual private network in a cloud environment, the probe agent configured to detect network traffic representing data movement between a second workload in the virtual private network and the first workload in the virtual private network;

a result detection component configured to detect a scan result indicative of a data packet in the network traffic detected by the probe agent, wherein the scan result includes packet payload information and an indication of a sensitive data classification relative to the data packet; and a graph generator component configured to generate a graph representation that shows a traffic path of data movement between the second workload and the first workload, wherein the graph representation comprises a first node representing the first workload, a second node representing the second workload, and an edge between the first node and second node, the edge representing the packet payload information and the sensitive data classification.

19. The computing system of claim 18, wherein the probe agent comprises a program attached to one or more probe points in at least one of a kernel or user-space application in the first workload.

20. The computing system of claim 18, wherein the probe agent comprises:

kernel probe code that runs in a host kernel space of the first workload and is configured to intercept data packets transmitted using a transport layer protocol;

user space probe code that runs in a host user space of the first workload and is configured to intercept the network traffic prior to encryption;

a scanner engine configured to extract the packet payload information; and a telemetry component configured to perform one or more telemetry functions based on the packet payload information.

* * * * *